(12) United States Patent
Angal et al.

(10) Patent No.: US 7,836,510 B1
(45) Date of Patent: Nov. 16, 2010

(54) FINE-GRAINED ATTRIBUTE ACCESS CONTROL

(75) Inventors: Rajeev Angal, San Jose, CA (US); Qingwen Cheng, Fremont, CA (US); Heng-Ming Hsu, Sunnyvale, CA (US); Malla Simhachalam, Sunnyvale, CA (US); Dilli Dorai Minnal Arumugam, Cupertino, CA (US)

(73) Assignee: Oracle America, Inc., Redwood City, CA (US)

( * ) Notice: Subject to any disclaimer, the term of this patent is extended or adjusted under 35 U.S.C. 154(b) by 1247 days.

(21) Appl. No.: 10/836,991

(22) Filed: Apr. 30, 2004

(51) Int. Cl.
*G06F 21/22* (2006.01)
(52) U.S. Cl. ............... 726/27; 726/4; 726/5; 726/8; 705/51
(58) Field of Classification Search .......... 726/4, 726/5, 8, 27; 713/161; 705/51
See application file for complete search history.

(56) References Cited

U.S. PATENT DOCUMENTS

| | | | |
|---|---|---|---|
| 5,684,950 A | 11/1997 | Dare et al. | |
| 5,884,312 A | 3/1999 | Dustan et al. | |
| 5,898,780 A | 4/1999 | Liu et al. | |
| 5,944,824 A | 8/1999 | He | |
| 6,161,139 A | 12/2000 | Win et al. | |
| 6,263,342 B1 | 7/2001 | Chang et al. | |
| 6,405,214 B1 | 6/2002 | Meade | |
| 6,438,690 B1 | 8/2002 | Patel et al. | |
| 6,587,124 B1 | 7/2003 | Slaby | |
| 6,609,198 B1 | 8/2003 | Wood et al. | |
| 6,807,636 B2 | 10/2004 | Hartman et al. | |
| 6,892,307 B1 | 5/2005 | Wood et al. | |
| 7,016,877 B1 | 3/2006 | Steele et al. | |
| 7,085,840 B2 | 8/2006 | de Jong et al. | |

(Continued)

FOREIGN PATENT DOCUMENTS

EP 0 940 960 A1 3/1998

(Continued)

OTHER PUBLICATIONS

Lurie, Marty, "The Federation—Database Interoperability, the Adventure Continues (Part 2)," IBM, Jul. 17, 2003, located in the internet at http://www-128.ibm/developerworks/db2/library/techarticle/0307lurie/0307lurie.html, 19 pages.

(Continued)

*Primary Examiner*—Matthew B Smithers
*Assistant Examiner*—Paul Callahan
(74) *Attorney, Agent, or Firm*—Osha • Liang LLP (57) ABSTRACT

A mechanism is disclosed for enabling an attribute provider service (APS), which provides access to one or more attributes, to control access to the attributes at the attribute level. In one implementation, a request is received, which specifies a particular attribute that is desired to be accessed from an attribute repository. In response to this request, a policy that applies to the particular attribute is accessed. The policy is then processed to determine whether access to the particular attribute is to be allowed or denied. With the above mechanism, it is possible to control access to attributes at the attribute level rather than at the service level. Because access control is exercised at such a low level, an administrator can exercise much tighter and precise control over how attributes provided by an APS are accessed.

8 Claims, 7 Drawing Sheets

U.S. PATENT DOCUMENTS

| | | |
|---|---|---|
| 7,350,075 B1 | 3/2008 | Eastham |
| 7,401,083 B2 | 7/2008 | Daemke et al. |
| 2001/0029501 A1 | 10/2001 | Yokobori et al. |
| 2002/0029336 A1 | 3/2002 | Sekiyama et al. |
| 2002/0073088 A1 | 6/2002 | Beckmann et al. |
| 2002/0078042 A1 | 6/2002 | Mata |
| 2002/0143755 A1 | 10/2002 | Wynblatt et al. |
| 2002/0143943 A1 | 10/2002 | Lee et al. |
| 2003/0149781 A1 | 8/2003 | Yared et al. |
| 2003/0172127 A1 | 9/2003 | Northrup et al. |
| 2004/0001594 A1 | 1/2004 | Krishnaswamy et al. |
| 2004/0003139 A1 | 1/2004 | Cottrille et al. |
| 2004/0003251 A1 | 1/2004 | Narin et al. |
| 2004/0003268 A1 | 1/2004 | Bourne et al. |
| 2004/0003269 A1 | 1/2004 | Waxman et al. |
| 2004/0003270 A1 | 1/2004 | Bourne et al. |
| 2004/0015783 A1 | 1/2004 | Lennon et al. |
| 2004/0059728 A1 | 3/2004 | Miller et al. |
| 2004/0073661 A1 | 4/2004 | Eibach et al. |
| 2004/0083243 A1 | 4/2004 | Feng et al. |
| 2004/0117170 A1 | 6/2004 | Walsh et al. |
| 2004/0117460 A1 | 6/2004 | Walsh et al. |
| 2004/0186826 A1 | 9/2004 | Choi et al. |
| 2004/0230571 A1 | 11/2004 | Robertson |
| 2004/0260949 A1 | 12/2004 | Aoki et al. |

FOREIGN PATENT DOCUMENTS

| | | |
|---|---|---|
| EP | 1370963 A1 | 3/2002 |
| EP | 1091274 A2 | 4/2002 |
| GB | 2387991 A | 3/2003 |
| WO | WO 00/60484 A1 | 5/2000 |
| WO | WO 02/058336 A1 | 7/2002 |

OTHER PUBLICATIONS

United Kingdom Patent Office, "Combined Search and Examination Report," in regards to Application No. GB0507718.5, report dated Jun. 23, 2005, 5 pages.

Current Claims, Application No. GB0507718.5, 8 pages.

Liberty Alliance Project, "Liberty ID-FF Architecture Overview," Version 1.2, 2003, pp. 1-44.

United Kingdom Patent Office, "Examination Report under Section 18(3)" in regards to Application No. GB0507718.5, report dated May 16, 2006, 2 pages.

Current Claims, Application No. GB0507718.5, 9 pages.

FINE-GRAINED ATTRIBUTE ACCESS CONTROL

BACKGROUND

Websites have greatly proliferated in recent years. The number of services provided by websites has also grown quite rapidly, to the point that almost any type of service may now be obtained via the Internet. The growth in the number of websites has largely occurred without any concerted effort to integrate the various sites. That is, each website has typically been created and maintained as a standalone site, and has generally not been constructed to interact, cooperate, or share information with other websites. As a result, users generally have to maintain a separate and distinct user account on each website. For example, a user may have one account on a book vending website, another account on a computer system vending website, yet another account on a travel agency website, and so on. Having all of these accounts generally forces the user to remember a user name and password for each account. In addition, because each website is its own standalone site, the user typically has to log in separately to each website to use the services provided thereon. Furthermore, the user generally has to provide the same set of information (e.g. first name, last name, address, etc.) over and over again to the various sites, which can be time consuming and tedious.

In an attempt to enable separate websites to interact and share information with each other (thereby, easing the burden on the user), an organization known as the Liberty Alliance has been formed. The Liberty Alliance is a standards organization that has established a Liberty standard, which governs interaction between various websites. The Liberty standard sets forth standard protocols and schemas that can be used to facilitate such interaction. As it currently stands, the Liberty standard comprises two major aspects: a federation framework and a web services framework.

The federation framework makes it possible to set up a circle of trust among a plurality of websites. Within this circle of trust, account linking can be implemented such that an account on one website can be mapped to an account on another website. With such account linking, it is possible to achieve single sign-on (SSO), whereby a user logs in to an account on just one of the websites within the circle of trust and can thereafter access accounts on other websites within the circle of trust without having to log in to those websites. While the accounts on the various websites are linked, the information in the accounts is not necessarily shared (unless the parties specifically agree to share some or all of the information). Thus, with the federation framework, the information in each account remains private to its associated website.

The web services framework enables information to be easily shared among a plurality of websites. With the web services framework, a user can maintain information in a central repository located at one of the websites, and can direct other websites to consult that central repository to obtain information pertaining to the user. For example, a user can maintain his personal profile information (e.g. name, address, phone number, etc.) at a website A. When the user visits a website B (which may, for example, be a website that sells certain goods), and website B requires certain information about the user (for example, an address to which to ship a purchased item), website B can request the user information from website A. With the web services framework, the user does not have to provide his information to each website that he patronizes.

Often, the information that is shared using the web services framework is very sensitive information, such as for example a user's address, social security number, credit card information, etc. Consequently, ensuring that this information is shared with only the proper parties is a major concern of the framework. For this reason, a web service provider usually implements a security mechanism to authenticate a service requester before allowing the service requester to access the web service. For example, web service A on website A may implement a security mechanism to authenticate website B before it allows website B to access web service A. This helps to ensure that the information provided by a web service is accessed only by authorized parties.

While such a security mechanism provides some desirable security, the security that it provides is at the web service level (i.e. whether the web service can be accessed at all), which is a relatively high level. This in turn means that the protection afforded by the security mechanism is relatively coarse-grained. The coarse-grained nature of this protection does not give an administrator as much control as would be desired in many implementations.

SUMMARY

In accordance with one embodiment of the present invention, there is provided a mechanism for enabling information access to be controlled at a more fine-grained level. In one embodiment, a web service (referred to herein as an attribute provider service (APS)) which makes one or more attributes available to service requesters (referred to herein as attribute consumers) can control access to the attributes at the attribute level rather than at the web service level. The attribute level is a much lower level than the web service level. With such fine grained control, it is possible to achieve many desirable results, such as for example, allowing a particular attribute consumer to access an APS, but limiting the attributes that can be accessed by that attribute consumer to just a subset of the attributes provided by the APS.

In one embodiment, attribute access control is implemented as follows. Initially, a request is received, which specifies a particular attribute that is desired to be accessed from an attribute repository. In addition to the particular attribute, the request may also specify other sets of information, including for example, a subject, a resource (e.g. a service), an action (e.g. read, write) to be taken, and other parameters. In response to this request, a policy that applies to the particular attribute and to the other sets of information specified in the request is accessed. For example, if the request specifies a subject and the particular attribute, then a policy that applies to that subject and the particular attribute is accessed. In one embodiment, this policy includes information that can be used to determine whether access to the particular attribute is to be allowed or denied. For example, the policy may include one or more conditions, and a result value, which indicates whether access to the particular attribute is to be allowed or denied if the conditions are satisfied.

After the policy is accessed, it is processed to determine whether access to the particular attribute is to be allowed or denied. In one embodiment, processing the policy includes evaluating the conditions specified in the policy to determine whether they are met. If all of the conditions are satisfied, then the result value (which may be, for example, "allow" or "deny") is used as the decision on whether to allow or deny access to the particular attribute. If not all of the conditions are satisfied (i.e. if one or more of the conditions are not satisfied), then the opposite of the result value is used as the decision on whether to allow or deny access to the particular attribute.

With the above mechanism, it is possible to control access to attributes at the attribute level rather than at the service level. Because access control is exercised at such a fine-grained level, an administrator can exercise much tighter and precise control over how attributes provided by an APS are accessed.

DETAILED DESCRIPTION OF EMBODIMENT(S)

Background Information

Before describing an embodiment of the present invention in detail, some background information on the Liberty web services framework will first be provided in order to facilitate a complete understanding of the invention.

Figure 1:
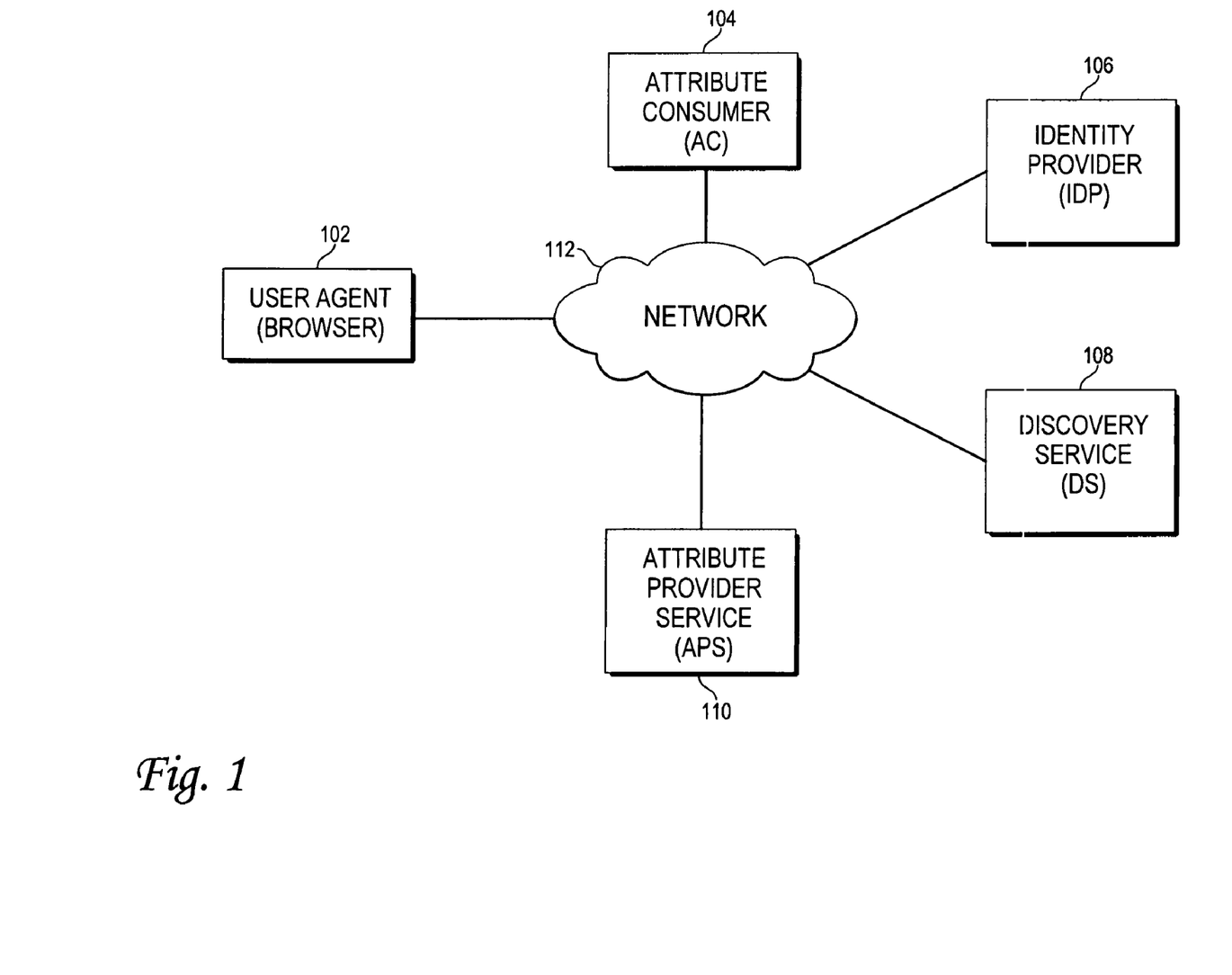
FIG. 1 is a functional block diagram showing some of the basic participants in the web services framework of the Liberty standard.

FIG. 1 shows a functional block diagram of some of the basic participants in the web services framework. For the sake of simplicity, only one of each participant is shown in FIG. 1. As shown, the participants include a user agent 102, an attribute consumer (AC) 104, an identity provider (IDP) 106, a discovery service (DS) 108, and an attribute provider service (APS) 110. The various participants are interconnected via a network 112 (the Internet, for example).

The user agent 102 is the participant that is used by a human user to access services on the network 112. The user agent 102 may be, for example, a browser running on a general purpose computer, a mobile device (e.g. mobile phone, personal digital assistant (PDA), etc.), or any other mechanism that enables a user to access services on the network 112.

The attribute consumer 104 may be any entity that provides a service to the user that will eventually request and consume some of the attributes of the user. For example, the attribute consumer 104 may be an application on a website that enables the user to purchase certain merchandise online. When the user checks out, the attribute consumer 104 may request and consume some of the attributes of the user, such as the user's address for delivering the purchased items.

The APS 110 is the participant that provides the requested attributes to the attribute consumer 104. The APS 110 may be, for example, a personal profile service that maintains all of the personal profile information for the user, such as the user's name, address, telephone numbers, etc. The APS 110 may also be a wallet service that maintains all of the financial information for the user, such as the user's credit card numbers, bank account information, etc. The APS 110 may maintain this and any other type of information pertaining to the user. A significant point about the APS 110 is that ii acts as a central repository for the information that it maintains. Whenever this information is needed by an attribute consumer 104, the attribute consumer 104 can request it from the APS 110 rather than from the user. As a result, the user need not manually provide this information to each attribute consumer 104 that he patronizes.

The identity provider 106 is the participant that is responsible for authenticating a user for all of the participants within a circle of trust. In most implementations, the identity provider 106 is the only participant within a circle of trust that is allowed to authenticate a user. All other participants within the circle of trust will rely upon the authentication determination made by the identity provider 106.

The discovery service 108 is the participant that acts as a service directory for all of the attribute consumer's 104 in a circle of trust. More specifically, the discovery service 108 stores information on each attribute service provided by each APS 110. The discovery service 108 also stores information on which attributes are provided by each attribute service, and how those attributes are to be requested. Each APS 110 registers this information with the discovery service 108 when it makes its attribute service(s) available. In addition, the discovery service 108 stores information indicating which APS 110 provides which particular attribute service for which particular user (for example, user A may have his personal profile service provided by one APS 110 while user B may have his personal profile service provided by another APS 110). With this information stored in the discovery service 108, when an attribute consumer 104 needs to find out which APS 110 is the host for a particular attribute service for a particular user, the attribute consumer 104 can consult the discovery service 108. The discovery service 108 will provide the information that the attribute consumer 104 will need to access the correct APS 110.

Figure 2:
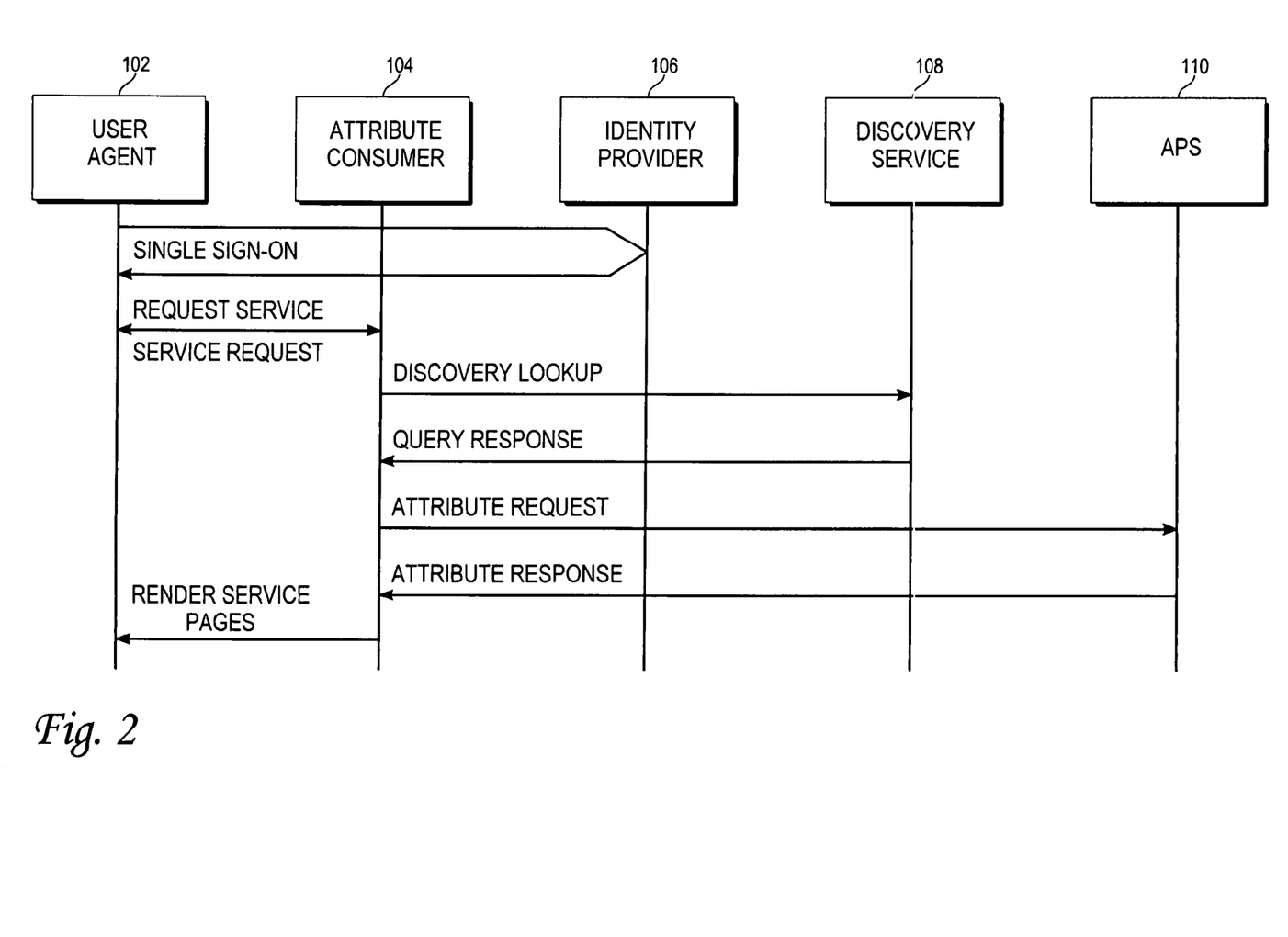
FIG. 2 is an operational flow diagram illustrating the interaction between the various participants of FIG. 1 in a sample transaction.

To illustrate how the various participants interact in accordance with the Liberty standard, a sample transaction will now be described with reference to FIG. 2. As shown in FIG. 2, the transaction begins with the user agent (browser) 102 making a request to sign-on to the attribute consumer 104 (which may, for example, be an application on a merchant website, which is also a service provider under the federation framework). Realizing that this is a sign-on request, and that it is not an identity provider, the attribute consumer 104 redirects the sign-on request to the identity provider 106. Upon receiving the request, the identity provider 106 interacts with the user via the browser 102 to determine whether the user is authentic. This interaction may involve any type of authentication procedure, including but not limited to the entry and verification of a username and password. If the user is authenticated, then the identity provider 106 creates a session. This session is valid for all of the attribute consumers 104 within the circle of trust for which the identity provider 106 serves as the authentication authority. This means that if the user visits another attribute consumer 104 within the circle of trust, the user will not have to repeat the sign-on process; thus, single sign-on is achieved.

Upon authenticating the user, the identity provider 106 returns a set of information either to the attribute consumer 104 or to the browser 102, which forwards the set of information to the attribute consumer 104. This set of information includes information pertaining to the session, as well as information indicating that the user has been authenticated. It also includes some bootstrap information, which includes an endpoint (e.g. a universal resource locator (URL)) for the discovery service 108, and some credential information needed to access the discovery service 108.

After receiving the set of information provided by the identity provider 106, the attribute consumer 104 validates the information to make sure that the user has indeed been authenticated. If so, then the attribute consumer 104 creates a local session that can be used to interact with the user. Thereafter, the attribute consumer 104 can interact freely with the browser 102. Thus, the browser 102 may request service, and the attribute consumer 104 may service the requests. This exchange between the browser 102 and attribute consumer 104 may take place any number of times to further a transaction (for example, to enable the user to put items into an online shopping cart). At some point (for example, at check out time), the attribute consumer 104 may need to get some attribute information for the user (for example, an address for the user to which purchased items may be sent). At that time, the attribute consumer 104 does not solicit the information from the user. Rather, it tries to obtain it from an appropriate APS 110.

To do so, the attribute consumer 104 sends a query (a discovery lookup) to the discovery service 108. Recall that bootstrap information was provided to the attribute consumer 104, and that the bootstrap information included the endpoint to the discovery service 108; thus, the attribute consumer 104 knows how to contact the discovery service 108. Included in the query are: the credential information that was part of the bootstrap information; information identifying the user; and the attribute service that is needed (in this example, it will be assumed that the user's address is provided by a personal profile service). Basically, this query is asking the discovery service for information on which APS 110 is providing the personal profile service for this user.

Upon receiving the query, the discovery service 108 verifies the credential information to ensure that it is valid. If so, then the discovery service 108 performs a lookup to determine which APS 110 is providing the personal profile service for this user. Upon finding the requested information, the discovery service 108 sends a query response to the attribute consumer 104. This query response includes an endpoint for the APS 110 that is providing the personal profile service for this user, and some credential information needed to access the APS 110. The query response may also include information indicating what attributes are provided by the personal profile service, and how those attributes may be requested.

Given the information in the query response, the attribute consumer 104 has everything it needs to access the proper APS 110. Using the endpoint, the attribute consumer 104 sends an attribute request to the proper APS 110. Included in this request is the credential information received from the discovery service 108. Also included is a request for a particular attribute service (the personal profile service in the current example), a particular attribute (the user address in the current example) provided by that service, and information identifying the user.

Upon receiving this request, the APS 110 verifies the validity of the credential information included with the request. If the credential information is valid, then the APS 110 fulfills the request by accessing an attribute repository, and extracting a value for the requested attribute for the specified user. The requested information is provided to the attribute consumer 104 in an attribute response.

When the attribute consumer 104 receives the response, it has the information that it needs for the user. Hence, it is able to render any necessary service pages to complete the transaction with the user.

With this background information in mind, an embodiment of the present invention will now be described.

Conceptual Overview

Figure 3:
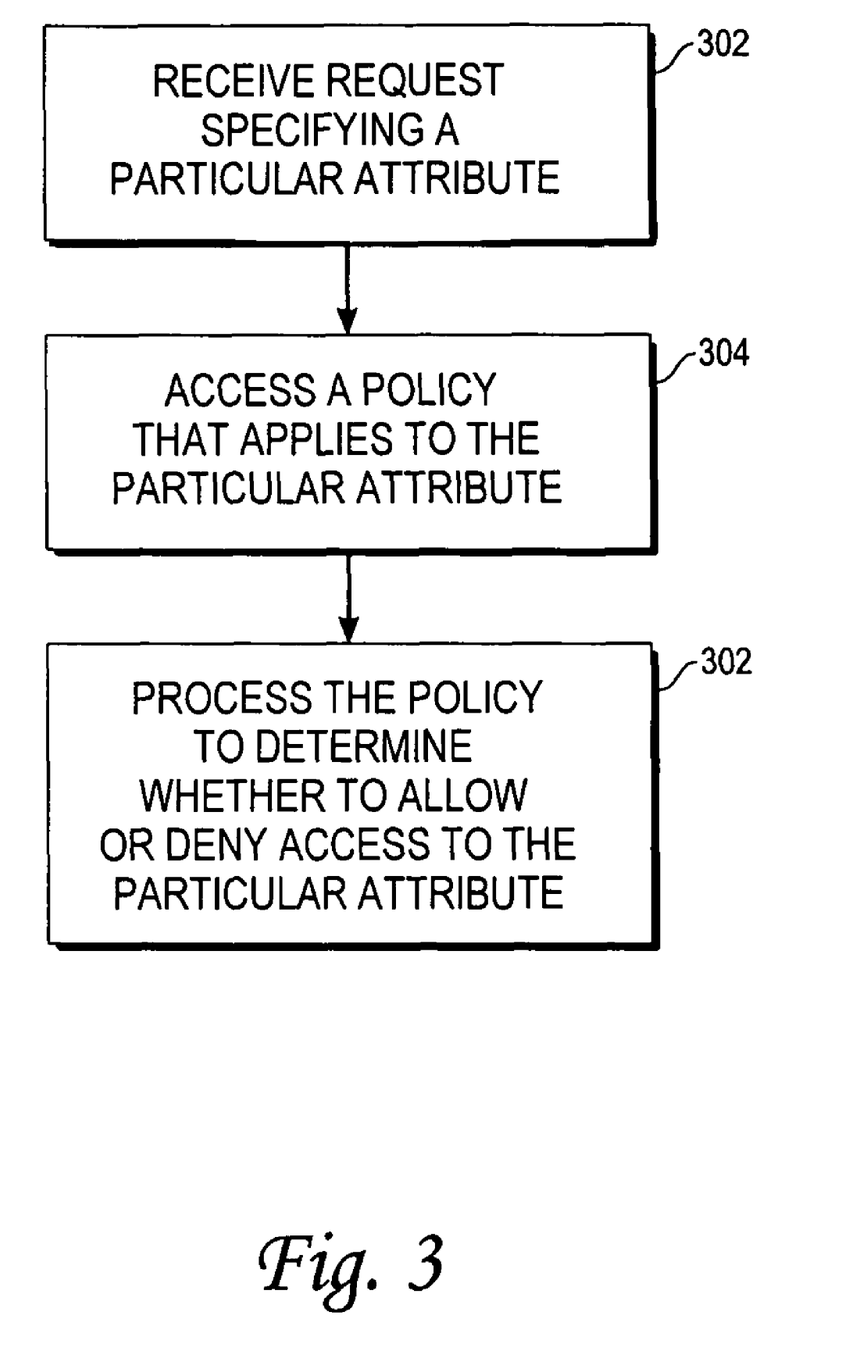
FIG. 3 is an operational flow diagram, which provides an overview of one embodiment of the present invention.

FIG. 3 shows an operational flow diagram, which provides an overview of one embodiment of the present invention. The flow diagram of FIG. 3 shows how access to attributes may be controlled by an APS 110 at the attribute level. As used herein, the term attribute refers broadly to any set of information pertaining to any entity. The entity may be a physical entity (for example, a human user), or a logical abstraction (for example, a group of users, an organization, a company, etc.). Examples of attributes include, but are certainly not limited to, first name, last name, address, social security number, credit card number, etc. An attribute may have one or more associated values, and these values may differ for each entity. For example, for user X, the value for the "social security number" attribute may be xxx-xx-xxxx, while for user Y, the value for the same attribute may be yyy-yy-yyyy.

In one embodiment, a request is initially received (block 302), which specifies a particular attribute that is desired to be accessed from an attribute repository. In addition to the particular attribute, the request may also specify other sets of information, including for example, a subject, a resource (e.g. a service), an action (e.g. read, write) to be taken, and other parameters.

In response to this request, a policy that applies to the particular attribute and to the other sets of information specified in the request is accessed (block 304). For example, if the request specifies a subject and the particular attribute, then a policy that applies to that subject and the particular attribute is accessed. In one embodiment, this policy includes information that can be used to determine whether access to the particular attribute is to be allowed or denied. For example, the policy may include one or more conditions, and a result value, which indicates whether access to the particular attribute is to be allowed or denied if the conditions are satisfied.

After the policy is accessed, it is processed (block 306) to determine whether access to the particular attribute is to be allowed or denied. In one embodiment, processing the policy includes evaluating the conditions specified in the policy to determine whether they are met. If all of the conditions are satisfied, then the result value (which may be, for example, "allow" or "deny") is used as the decision on whether to allow or deny access to the particular attribute. If not all of the conditions are satisfied (i.e. if one or more of the conditions are not satisfied), then the opposite of the result value is used as the decision on whether to allow or deny access to the particular attribute.

In one embodiment, the result value may take on values other than "allow" and "deny". In one embodiment, these other values may be "interact for consent" and "interact for value". The "interact for consent" result value indicates that access will be allowed if consent is obtained from the user to which the particular attribute pertains. The "interact for value" result value indicates that access will be allowed if the user to which the particular attribute pertains provides some valid authorization information. Both call for interaction with the user. Thus, in the case where the decision is one of these result values, then user input is caused to be solicited from a user, and this user input is received. A determination is then made as to whether the user input is proper user input. In the consent case, proper user input is input that indicates that the user has consented to having the attribute accessed. In the value case, proper user input is authorization information (e.g. a personal identification number) that is valid. If the user input is proper user input, then access to the particular attribute is allowed. Otherwise, access is denied.

By processing a request as described above, it is possible to control access to attributes at the attribute level rather than at the service level. Because access control is exercised at such a fine-grained level, an administrator can exercise tight and precise control over how attributes provided by an APS are accessed.

Attribute Provider Service (APS)

Figure 4A:
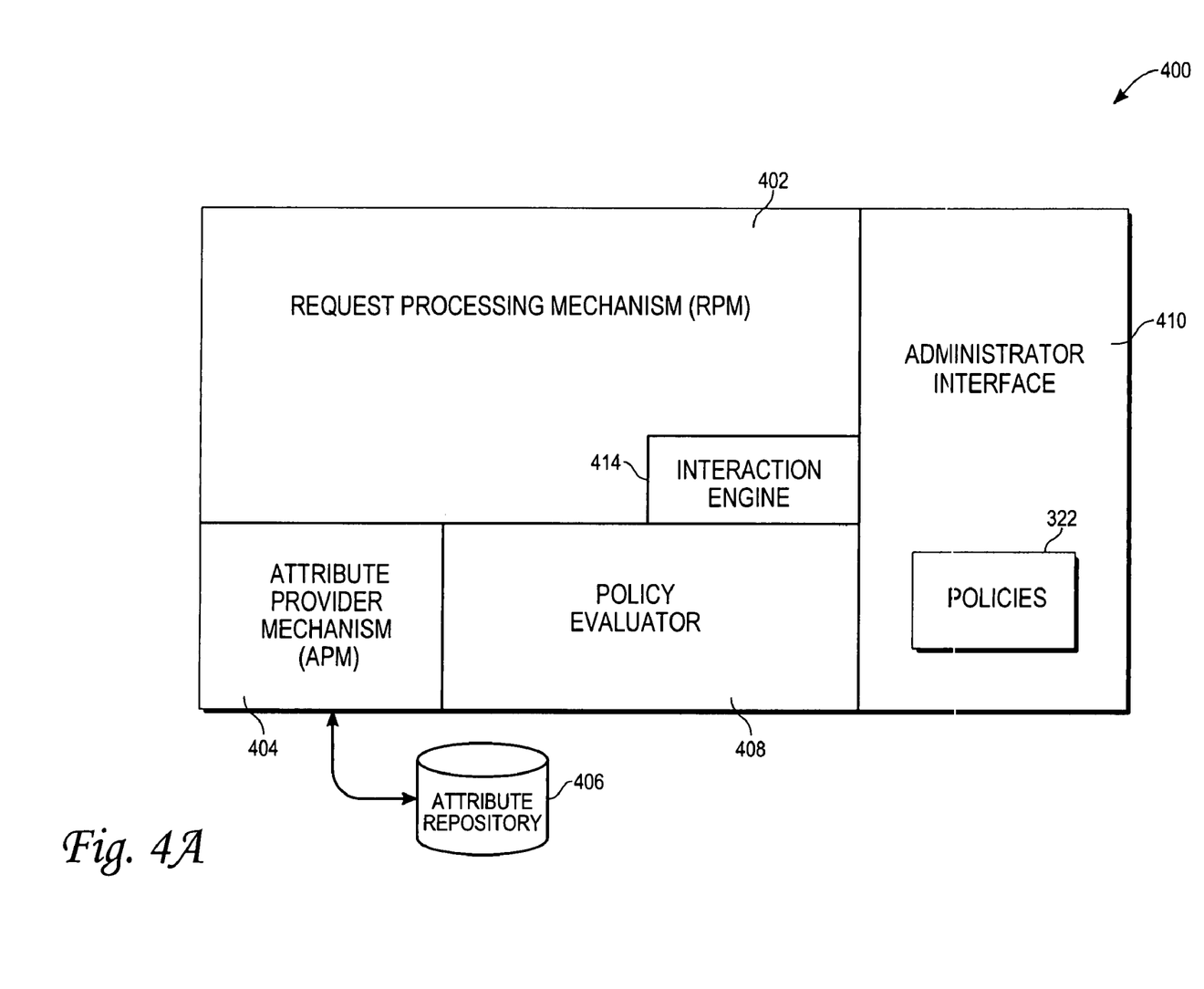
FIG. 4A is a functional block diagram of an attribute provider service in accordance with one embodiment of the present invention.

With reference to FIG. 4A, there is shown a functional block diagram of an APS 400 implemented in accordance with one embodiment of the present invention. This APS 400 may be used as APS 110 in FIG. 1, for example. In the following discussion, the Liberty standard will be referenced for illustrative purposes. However, it should be noted that the concepts disclosed herein are not limited to the Liberty standard, or any other standard. The fact that APS 400 may be implemented in such a way that it complies with a standard is just an additional advantage provided by the APS 400.

As shown in FIG. 4A, APS 400 comprises a request processing mechanism (RPM) 402, an attribute provider mechanism (APM) 404, an attribute repository 406, a policy evaluator 408, and an administrator interface 410. In one embodiment, the functionalities of components 402-410 are implemented by way of software (i.e. the functionalities are achieved by having a computer system, such as system 600 shown in FIG. 6, execute one or more sets of instructions). Alternatively, the functionalities may be implemented using hardwired logic (e.g. as an ASIC). These and other implementations are within the scope of the present invention.

Request Processing Mechanism (RPM)

In one embodiment, RPM 402 is the component responsible for receiving and processing attribute requests from attribute consumers 104. RPM 402 is also responsible for providing responses to the attribute consumers 104. In carrying out its responsibilities, RPM 402 takes care of all of the Liberty-specific aspects of request processing. More specifically, when RPM 402 receives an attribute request, that request will be in a Liberty-compliant format (assuming that the request came from a Liberty-compliant attribute consumer 104). In response, RPM 402 processes the request in accordance with all of the Liberty requirements. This may include processing the request using certain protocols (for example, Liberty uses the simple object access protocol (SOAP); thus, RPM 402 may process the request using SOAP). Request processing may also involve implementing certain security measures, for example, verifying the credential information provided by the attribute consumer 104 in the request to ensure that it is valid. Request processing may further involve applying a high-level access policy to the request to determine whether this particular attribute consumer 104 is allowed to access the service (for example, the personal profile service) specified in the request (note: this policy should not be confused with policies 412, which will be discussed in greater detail in a later section). In addition, request processing may involve providing the response to the attribute consumer 104 in a format that is Liberty-compliant. Overall, RPM 402 takes care of all of the Liberty-specific aspects of request processing so that other components are shielded from those aspects.

Attribute Provider Mechanism (APM) and Attribute Repository

While RPM 402 performs the initial processing of an attribute request and the final processing of an attribute response, it does not perform the actual processing needed to satisfy the substance of the attribute request. Instead, RPM 402 invokes the APM 404 to perform that processing. Because RPM 402 takes care of all of the Liberty-specific aspects of request processing, by the time a request makes its way to APM 404, the Liberty-specific aspects of the request have for the most part been removed. As a result, APM 404 does not need to be aware of or comply with the Liberty standard.

In one embodiment, the APM 404 interacts with the attribute repository 406 to satisfy an attribute request. More specifically, when the APM 404 receives an attribute request for a particular attribute of a particular entity (e.g. a particular user), the APM 404 interacts with the attribute repository 406 to obtain therefrom one or more values for the particular attribute of the particular entity. In one embodiment, the attribute repository 406 stores all of the values for all of the attributes provided by the overall APS 400. The attribute repository 406 may take on any desired form, including but not limited to a hierarchical database, a relational database, etc.

Policy Evaluator

In one embodiment, before the APM 404 interacts with the attribute repository 406 to obtain a value for a particular attribute, the APM 404 first invokes the policy evaluator 408 to obtain a determination as to whether access to the particular attribute is to be allowed or denied. As part of this invocation, the APM 404 passes in the particular attribute, and optionally, one or more other sets of information (such as a subject, a resource, an action, etc.). In response to this invocation (which may be viewed as an authorization request from the APM 404), the policy evaluator 408 consults a repository of attribute access policies 412, which govern access to specific attributes. In one embodiment, the policy evaluator 408 searches through the policies 412 to find a policy that applies to the particular attribute and to the other sets of information passed in by the APM 404. The policy evaluator 408 then processes the policy to determine whether to allow or deny access to the particular attribute. This determination is returned to the APM 404. The APM 404 then uses the determination to decide whether to service the request for the particular attribute.

In some instances, the policy evaluator 408 may not make a simple allow or deny determination, but rather may make a determination of "interact for consent" or "interact for value" (as discussed previously). In such a case, the policy evaluator 408, in one embodiment, will invoke the interaction engine 414 to solicit and to receive user input from a user. The policy evaluator 408 will then determine whether the user input is proper user input. If so, the policy evaluator 408 will allow access to the particular attribute. Otherwise, access will be denied. The operation of the policy evaluator 408 will be discussed in greater detail in a later section.

Administrator Interface

The administrator interface 410, which in one embodiment, acts as a control console, enables an administrator to easily dictate and control the operation of the APS 400. In one embodiment, the administrator interface 410 enables an administrator to configure many aspects of the APS 400. In addition, the administrator interface 410 allows an administrator to specify the policies 412 that govern access to specific attributes. In one embodiment, the policies 412 take the form of sets of data, i.e., they do not take the form of executable modules. Thus, they can be specified by an administrator using interface 410 without writing any programming code. Because no programming is required, the policies 412 may be specified by a relatively unsophisticated administrator.

For purposes of the present invention, interface 410 may be any type of user interface. It may range from a user interface as simple as a text editor to a graphical user interface that has sufficient logic to guide an administrator (through a series of questions) through the process of creating/deleting/editing policies 412. Basically, any user interface that is capable of allowing an administrator to specify the information needed to set forth policies 412 may be used as administrator interface 410.

Attribute Access Policies

Figure 5:
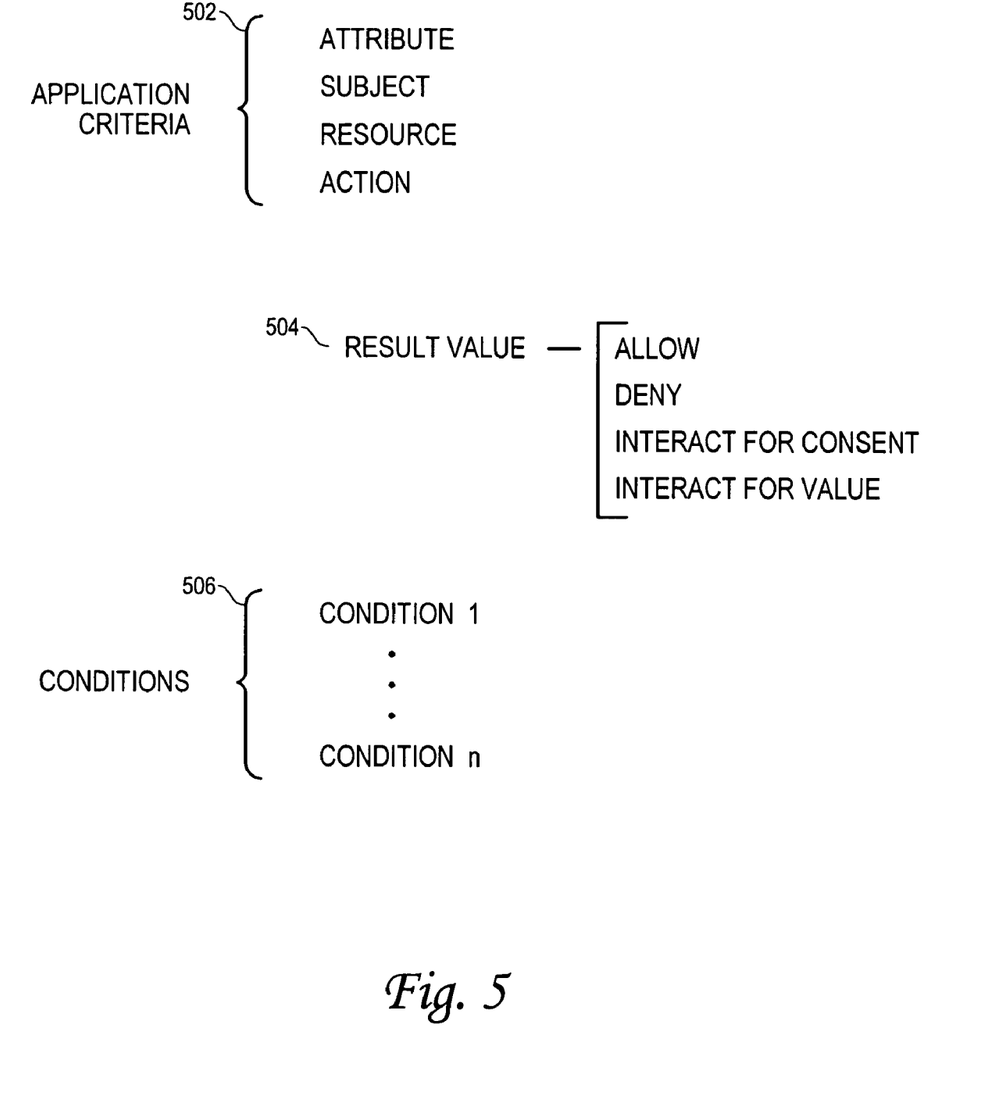
FIG. 5 shows a structure for an attribute access policy in accordance with one embodiment of the present invention.

For purposes of the present invention, attribute access policies 412 may take on any form and any structure, and contain any content. FIG. 5 shows one possible form of an attribute access policy 412, in accordance with one embodiment of the present invention. As shown in FIG. 5, an attribute access policy (hereinafter, policy for short) may include a set of application criteria 502, a result value 504, and a set of zero or more conditions 506.

Application Criteria

The application criteria 502 are used by the policy evaluator 408 to determine whether a policy applies to a particular request. In one embodiment, the application criteria 502 include an attribute specification, a subject, a resource, and an action. In one embodiment, the attribute specification is the only criterion that is required. The other parameters are optional. If so desired, the application criteria may include additional parameters.

The attribute specification sets forth the particular attribute or attributes to which a policy is to apply. For example, if a policy is to apply to the "address" attribute, then the "address" attribute would be specified in the attribute specification. Similarly, if the policy is to apply to a plurality of attributes, then that plurality of attributes would be specified in the attribute specification. Any number of attributes may be specified in the attribute specification. The attribute specification makes it possible to limit the application of a policy to just a specific set of attributes, which in turn, enables attribute access to be controlled at the attribute level.

The subject parameter is a set of information that specifies a specific physical entity or logical abstraction. The physical entity or logical abstraction may, for example, be something that is trying to get access to an attribute, or it may be something to which an attribute pertains. Examples of physical entities and logical abstractions that can be identified by a subject parameter include, but are certainly not limited to, a user, a role (e.g. manager, vice president, etc.), a group, an organization, an attribute consumer 104 trying to access an attribute, etc. With the subject parameter, it is possible to specify one or more parties to which a policy is to apply.

The resource parameter is a set of information that identifies a particular resource that is being requested in a request. The resource may be the service that is providing the attribute specified in the attribute specification. For example, if the "personal profile service" provides the "address" attribute, then the resource parameter may specify "personal profile service" and the attribute specification may specify "address". The resource parameter makes it possible to limit the application of a policy to a particular resource or service, in case multiple services provide the same attribute.

The action parameter specifies the action that is to be taken on an attribute. In one embodiment, the possible actions are get (analogous to a read) and post (analogous to a write). The action parameter makes it possible to limit the application of a policy based upon what action is to be taken on an attribute (for example, access to the attribute is denied only if the desired action is a post). Overall, the application criteria 502 enable an administrator to precisely limit the application of a policy, which in turn, enables the administrator to exercise precise control over attribute access.

Result Value

The result value 504 represents a possible access decision of the policy. In one embodiment, the result value 504 may take on one of four values: allow, deny, interact for consent, and interact for value. Allow and deny are self explanatory. "Interact for consent" and "interact for value" may be viewed as being conditional allows. That is, access is allowed if, after interaction with a user, proper user input is obtained. For "interact with consent", proper user input is input that indicates that the user has consented to the access. For "interact for value", proper user input is authorization information (e.g. a personal identification number) that is valid.

As noted above, the result value 504 represents just a possible decision on whether to allow or deny access to the attribute(s) specified in the attribute specification. It may not be the actual access decision. The result value 504 will become the actual access decision if all of the conditions 506 set forth in the policy are met. However, if some of the conditions 506 are not met, then the opposite of the result value 504 will become the actual access decision.

To illustrate, suppose that a policy contains a result value 504 of "deny". Suppose further that the policy has a set of conditions 506. When the policy evaluator 408 processes this policy, if a determination is made that all of the conditions 506 are met, then the actual access decision of the policy evaluator 408 will be "deny", as specified by the result value 504. However, if a determination is made that not all of the conditions 506 are met (i.e. one or more of the conditions 506 are not met), then the actual access decision of the policy evaluator 408 will be the opposite of the value specified by the result value 504, which will be "allow" in the present example (for this determination, "interact for consent" and "interact for value" are treated as if they were "allow").

Conditions

The conditions 506 dictate the circumstances under which the actual access decision will be that specified by the result value 504. In one embodiment, the conditions 506 are optional. That is, a policy need not specify any conditions 506. In such a case, the result value 504 will always be the access decision. If there are any conditions 506, there can be any number of them.

For purposes of the present invention, any criterion may be specified as a condition. For example, a condition may be time-based (e.g. a time range, a date range, etc.) so that access is allowed or denied only during certain times. A condition may be party-based so that access is allowed or denied to only certain parties. Basically, any criterion that needs to be met may be expressed as a condition. All possible conditions are within the scope of the present invention.

Policy Examples

With the application criteria 502, result value 504, and conditions 506, an administrator has great flexibility in defining an attribute access policy. This flexibility enables the administrator to define very precise policies to achieve very fine-grained control over attribute access. To illustrate the potential uses of attribute access policies, several sample policies will now be discussed.

Suppose that a user (User X) never wishes to have his social security number disclosed to anyone. To implement this, a policy may be defined where the attribute is specified as "social security number", the subject is specified as "User X", and the result value is specified as "deny", with no conditions specified. With this policy, whenever a request is received to access User X's social security number, access will be denied.

Suppose instead that User X wishes to make his social security number available to certain attribute consumers (AC1 and AC2). This result may be achieved with a policy wherein the attribute is specified as "social security number", the subject is "User X", the result value is "allow", and a condition is specified requiring that the attribute consumer requesting access be either AC1 or AC2. With this policy, if a request to access User X's social security number is received from either AC1 or AC2, then access will be allowed. Otherwise, access will be denied.

Suppose now that an administrator wishes to allow an "account balance" attribute to be updated (i.e. posted) between midnight and 2:00 AM each night when account updates are normally done, but not at any other time. To achieve this result, the administrator may define a policy wherein the attribute is "account balance", the action is "post", the result value is "allow", and the condition is that the time must be between midnight and 2:00 AM. With this policy, if a request to post to the account balance attribute is received between midnight and 2:00 AM, then access will be allowed. Otherwise, access will be denied (note that this policy will not apply and hence will not preclude read access to the "account balance" at any time).

Suppose further that an administrator wishes to establish a general rule that a credit card number can only be accessed if user consent is obtained. To achieve this result, the administrator may define a policy wherein the attribute is "credit card number" and the result value is "interact for consent" with no conditions specified. With this policy, whenever a request is received to access a credit card number, access is allowed only if the user to which the credit card number pertains provides his consent.

The above examples illustrate some useful results that may be achieved using properly defined attribute access policies. Myriad other useful results may be attained with other properly defined policies. All such policies are within the scope of the present invention.

Sample Operation

The various components of one embodiment of APS 400 have been disclosed. With reference to FIGS. 1, 4A, and 5, a sample operation of APS 400 will now be described. In the following discussion, it will be assumed that an administrator has already used the administrator interface 410 to define a plurality of attribute access policies 412. It will also be assumed that the service provided by APM 404 is the personal profile service.

Initially, a Liberty-compliant attribute request is received from an attribute consumer 104. This attribute request may specify many parameters, including but not limited to, a resource to be accessed (e.g. the personal profile service), one or more particular attributes to be accessed, the identity of the entity (e.g. a user) to which the particular attribute(s) pertain, the identify of the attribute consumer 104 that is sending the request, the action (e.g. get or post) to be taken on the particular attribute(s), etc.

The attribute request is initially fielded by the RPM 402. In response, the RPM 402 processes the request in accordance with all of the Liberty requirements. For example, RPM 402 implements all of the necessary protocols to extract information from the request (e.g. what service is being requested, which attribute consumer 104 is making the request, etc.). RPM 402 also implements all of the necessary security functions to ensure that the request is a valid request. Furthermore, RPM 402 may enforce one or more policies to make sure this service can be requested by this attribute consumer 104. Note that this policy check, if performed, is at the service level to determine whether this service can be accessed at all by this attribute consumer 104. This policy check does not make any determination as to whether the particular attribute(s) may be accessed. RPM 402 may perform the functions discussed above, as well as other functions required by the Liberty standard. Once that has been done, and the RPM 402 has determined that the request should be processed further, then the RPM 402 invokes the APM 404, and passes the attribute request to it. It is thereafter up to the APM 404 to process the substance of the attribute request.

In response to being invoked, APM 404 inspects the attribute request to determine which particular attribute or attributes are being requested. For each particular attribute, the APM 404 invokes the policy evaluator 408 to obtain a decision on whether to allow or deny access to the particular attribute. This invocation may be viewed as an authorization request from the APM 404 to the policy evaluator 408. In one embodiment, as part of the invocation, the APM 404 provides to the policy evaluator 408 several sets of information, including the particular attribute being accessed, the resource being accessed (e.g. the personal profile service), the identity of the entity (e.g. a user) to which the particular attribute pertains, the identify of the attribute consumer 104 that is sending the request, and the action (e.g. get or post) to be taken on the particular attribute. If so desired, the APM 404 may provide additional sets of information and parameters to the policy evaluator 408.

In response to the invocation, the policy evaluator 408 uses the information provided in the invocation to find an attribute access policy 412 that applies to the request. In one embodiment, the policy evaluator 408 does so by evaluating the application criteria 502 of each policy to determine whether those criteria match the information provided in the invocation (e.g. whether the attribute, subject, resource, and action of a policy match those provided in the invocation). If no match is found, then no policy applies to the request. In one embodiment, if this is the case, access to the particular attribute is allowed (as an alternative, if so desired, the default may be to deny access). On the other hand, if a match is found, thereby meaning that a policy applies to the request, then the policy evaluator 408 processes the policy to determine whether access to the particular attribute is to be allowed or denied.

In one embodiment, the policy evaluator 408 does so by evaluating each of the conditions 506 (if any) set forth in the policy. If all of the conditions 506 are satisfied, then the access decision will be that specified by the result value 504 of the policy. If not all of the conditions are satisfied (i.e. one or more of the conditions are not satisfied), then the access decision will be the opposite of that specified by the result value 504 (for this purpose, "interact for consent" and "interact for value" are treated as if they were "allow").

In some cases, the result value 504 will not be "allow" or "deny" but rather "interact for consent" or "interact for value". If the access decision reached by the policy evaluator 408 is either of these, then the policy evaluator 408 will invoke interaction engine 414 to interact with a user to obtain some user input.

In response to this invocation, the interaction engine 414 will send a message to the attribute consumer 104 that sent the attribute request, which in turn will forward the message to the user agent 102 that caused the attribute consumer 104 to send the attribute request. In the case of an "interact for consent", the message will: (1) inform the user that a request has been received to access the particular attribute; and (2) ask the user for consent to having the particular attribute accessed. In the case of an "interact for value", the message will: (1) inform the user that a request has been received to access the particular attribute; and (2) ask the user for some authorization information (e.g. a personal identification number) required to authorize the access.

In response to this message, the user will provide some user input to the user agent 102. In turn, the user agent 102 forwards the user input to the attribute consumer 104, which forwards the user input to the interaction engine 414, which forwards the user input to the policy evaluator 408. Upon receiving the user input, the policy evaluator 408 determines whether the user input is proper user input. In the "consent" case, proper user input is input that indicates that the user has consented to having the particular attribute accessed. In the "value" case, proper user input is authorization information that is valid. If the user input is proper user input, then access to the particular attribute is allowed. Otherwise, access is denied.

After the policy evaluator 408 processes the policy and arrives at an access decision, that access decision is returned to the APM 404. Based upon that decision, the APM 404 will know whether it should allow or deny access to the particular attribute. In one embodiment, the APM 404 and the policy evaluator 408 repeat this process for each particular attribute requested in the attribute request.

After an access decision has been received for all of the particular attributes requested in the attribute request, the APM 404 processes each attribute for which access is allowed. In one embodiment, this processing entails interacting with the attribute repository 406, and obtaining therefrom one or more values for each of the attributes for the entity specified in the attribute request. For example, if the attribute request is asking for the "social security number" attribute of the entity "User X", the value of the "social security number" attribute for User X will be obtained from the attribute repository 406.

After the APM 404 has obtained one or more values for each of the attributes for which access is allowed, the APM 404 returns the values to the RPM 402. In turn, the RPM 402 generates a request response, which incorporates the values received from the APM 404, in a format consistent with the Liberty standard, and sends the response to the attribute consumer 104. In this manner, the attribute request is serviced by the APS 400 in a way that enforces access restrictions at the attribute level.

Alternative Embodiment(s)

Thus far, the policy evaluator 408 has been described as being a separate mechanism that is invoked by the APM 404. This is not required. If so desired, the functionality of the policy evaluator 408 may be incorporated into the APM 404 so that it is the APM 404 that implements the access determination function. This and other embodiments are within the scope of the present invention.

Figure 4B:
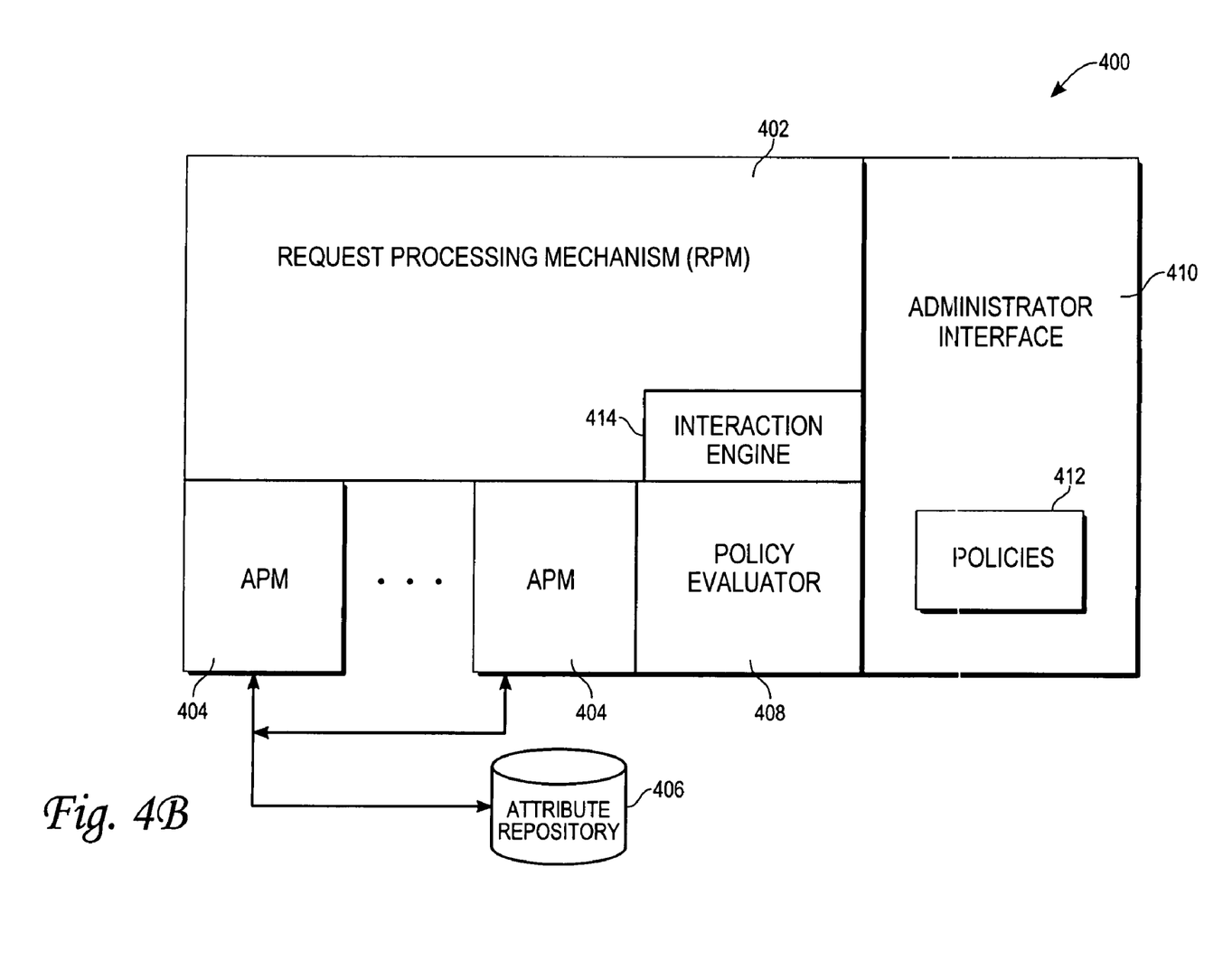
FIG. 4B is a functional block diagram of an attribute provider service in accordance with another embodiment of the present invention.

Also, FIG. 4A shows just one APM 404. It should be noted, though, that APS 400 may comprise a plurality of APM's 404, such as that shown in FIG. 4B. Each APM 404 may provide the same or different services (e.g. personal profile service, wallet service, etc.), and each APM 404 may be invoked by the RPM 402 depending on what service is being requested. In such an embodiment, each APM 404 may invoke the policy evaluator 408 to obtain access decisions, each APM 404 may implement its own access determination function, or there may be a combination where some APM's 404 invoke the policy evaluator 408 and some APM's 404 implement their own access determination function. These and other embodiments are within the scope of the present invention.

Hardware Overview

Figure 6:
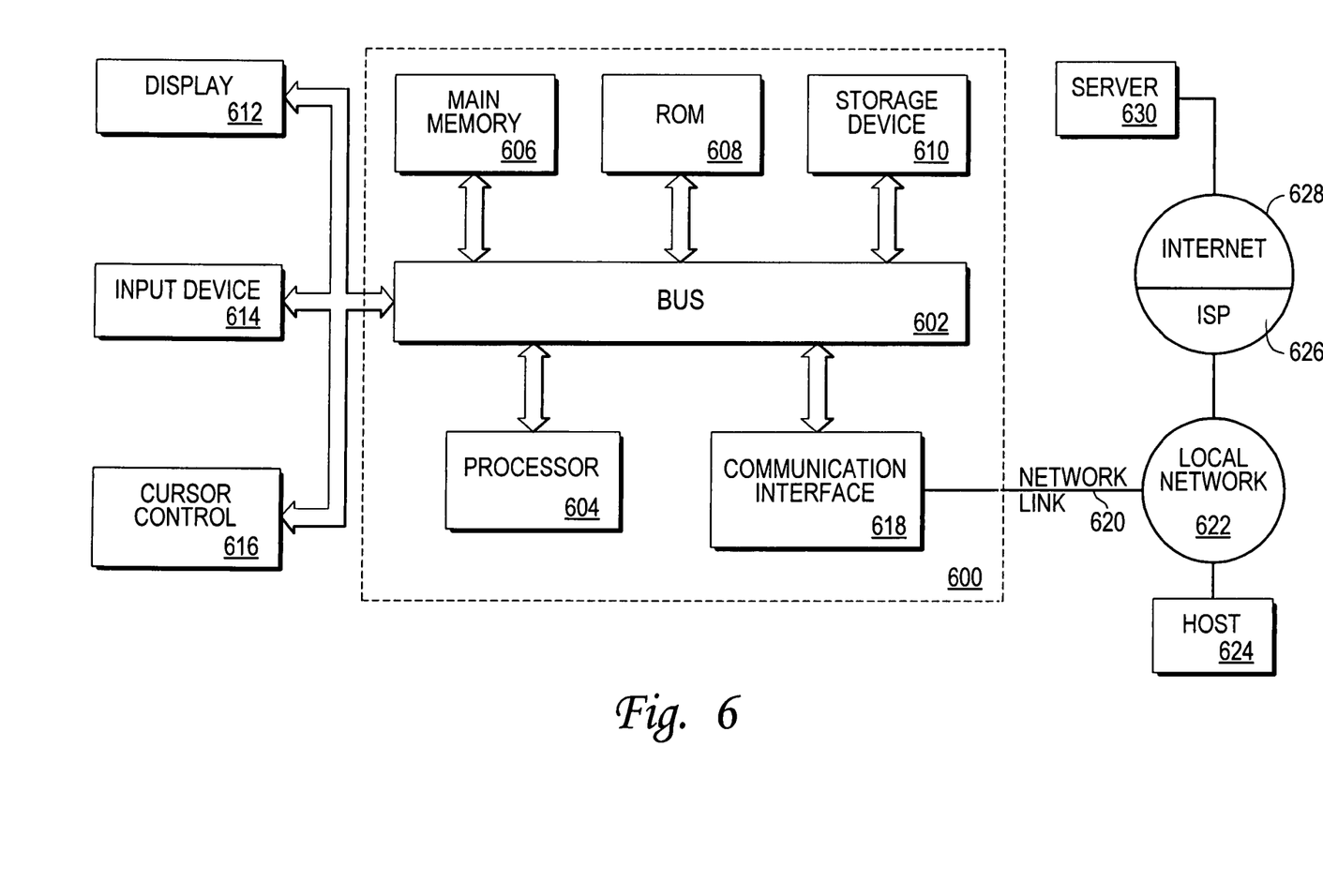
FIG. 6 is a block diagram of a general purpose computer system in which one embodiment of the present invention may be implemented.

FIG. 6 is a block diagram that illustrates a computer system 600 upon which an embodiment of the invention may be implemented. Computer system 600 includes a bus 602 for facilitating information exchange, and one or more processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions by processor 604. Computer system 600 may further include a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In computer system 600, bus 602 may be any mechanism and/or medium that enables information, signals, data, etc., to be exchanged between the various components. For example, bus 602 may be a set of conductors that carries electrical signals. Bus 602 may also be a wireless medium (e.g. air) that carries wireless signals between one or more of the components. Bus 602 may also be a medium (e.g. air) that enables signals to be capacitively exchanged between one or more of the components. Bus 602 may further be a network connection that connects one or more of the components. Overall, any mechanism and/or medium that enables information, signals, data, etc., to be exchanged between the various components may be used as bus 602.

Bus 602 may also be a combination of these mechanisms/media. For example, processor 604 may communicate with storage device 610 wirelessly. In such a case, the bus 602, from the standpoint of processor 604 and storage device 610, would be a wireless medium, such as air. Further, processor 604 may communicate with ROM 608 capacitively. In this instance, the bus 602 would be the medium (such as air) that enables this capacitive communication to take place. Further, processor 604 may communicate with main memory 606 via a network connection. In this case, the bus 602 would be the network connection. Further, processor 604 may communicate with display 612 via a set of conductors. In this instance, the bus 602 would be the set of conductors. Thus, depending upon how the various components communicate with each other, bus 602 may take on different forms. Bus 602, as shown in FIG. 6, functionally represents all of the mechanisms and/or media that enable information, signals, data, etc., to be exchanged between the various components.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. An attribute provider service (APS), comprising:
a processor;
a request processing mechanism (RPM), when executed by the processor, configured to:
 receive a request for an attribute from a consumer,
 forward the request to an attribute provider mechanism (APM) for processing,
 receive, from the APM, a response to the request, and
 provide the response to the consumer;
the APM, when executed by the processor, configured to:
 receive the request from the RPM,
 invoke, in response to the request, a policy evaluator to determine whether the consumer is allowed to access the attribute,
 receive a response from the policy evaluator indicating whether access to the attribute by the consumer is allowed,
 obtain an attribute value corresponding to the attribute from an attribute repository based on the response from the policy evaluator, and
 provide the response to the request to the RPM, wherein the response comprises the attribute value when the response from the policy evaluator indicates that access to the attribute by the consumer is allowed; and the policy evaluator, when executed by the processor, configured to:

identify an attribute level policy corresponding to the attribute, wherein the attribute level policy comprises at least one condition used to determine whether access to the attribute is allowed by the consumer wherein the attribute level policy is associated with application criteria, and wherein the application criteria comprises an attribute specification specifying the attribute, a subject parameter which identifies the consumer, a resource parameter which specifies a service that provides the attribute, and an action parameter which specifies an action that the consumer is allowed to perform on the attribute value, and determine, using the attribute level policy, whether to allow access to the attribute by the consumer.

2. The APS of claim 1, wherein the policy evaluator, when executed by the processor, is further configured to evaluate the at least one condition to determine whether it is satisfied to determine whether to allow access to the attribute.

3. The APS of claim 1, wherein the request specifies a subject and the attribute, and wherein the policy evaluator, when executed by the processor, is configured to identify the attribute level policy that corresponds to the subject and the attribute.

4. The APS of claim 1, wherein the request specifies a resource and the attribute, and wherein the policy evaluator, when executed by the processor, is configured to identify the attribute level policy that corresponds to the resource and the attribute.

5. The APS of claim 1, wherein the request specifies an action to be performed on the attribute, and wherein the policy evaluator, when executed by the processor, is further configured to identify the attribute level policy that applies to the action and the attribute.

6. The APS of claim 1, wherein the policy evaluator, when executed by the processor, is further configured, when determining whether to allow access to the attribute, to:

determining, based upon the attribute level policy, that access to the attribute is allowed when correct user input is received from the user;

invoking an interaction engine in the APS to request input from the consumer;

receiving, from the interaction engine, the input from the consumer; and determining, based at least in part on the input from the consumer, whether to allow the consumer to access the attribute.

7. The APS of claim 1, wherein the action parameter specifies at least one selected from a group consisting of get and post.

8. The APS of claim 1, wherein the subject parameter further identifies at least one selected from a group consisting of a role, a group, an organization, which may access the attribute.

* * * * *